United States Patent [19]

Kuribayashi

[11] 4,362,013

[45] Dec. 7, 1982

[54] METHOD FOR OPERATING A COMBINED PLANT

[75] Inventor: Tetsuzo Kuribayashi, Ibaraki, Japan

[73] Assignee: Hitachi, Ltd., Tokyo, Japan

[21] Appl. No.: 137,491

[22] Filed: Apr. 4, 1980

[51] Int. Cl.³ .................................................. F02C 6/18
[52] U.S. Cl. .............................. 60/39.02; 60/39.18 B
[58] Field of Search ........ 60/39.02, 39.14 R, 39.18 B, 60/646, 657; 122/7 R, 35, 507

[56] References Cited

U.S. PATENT DOCUMENTS

| 983,144 | 1/1911 | Jorgensen | 122/507 |
| 4,106,286 | 8/1978 | Sakai et al. | 60/39.18 B |
| 4,282,708 | 8/1981 | Kuribayashi et al. | 60/39.18 B |

Primary Examiner—Louis J. Casaregola
Attorney, Agent, or Firm—Antonelli, Terry and Wands

[57] ABSTRACT

A method of operating a combined plant made up of a gas turbine plant and a steam turbine plant utilizing the exhaust heat of the gas turbine as its power source; in which, after the steam turbine has been stopped and before it is started, the gas turbine is kept running at a low constant load for a certain period of time with the exhaust gas from the gas turbine being led partly to a by-pass duct and partly to a heat recovery boiler, during which time necessary operations to start or stop the combined plant (such as breaking the vacuum in the condenser) are performed.

8 Claims, 4 Drawing Figures

METHOD FOR OPERATING A COMBINED PLANT

BACKGROUND OF THE INVENTION

This invention relates to a method and device for operating a combined gas and steam turbine plant, and more particularly to a method and device for reducing the amount of nitrogen oxide (NOx) discharged when the plant is being stopped and started.

In stopping the combined plant using the conventional method, the gas turbine is operated at a constant load and the damper at the entrance of the heat recovery boiler is gradually closed and at the same time the by-pass damper by-passing the boiler is gradually opened to discharge the gas turbine exhaust gas into the atmosphere. That is, the amount of steam generated by the heat recovery boiler is reduced to lower the load of the steam turbine and after the steam turbine has been stopped the load of the gas turbine is lowered. In starting the plant using the conventional method, the steam from an auxiliary boiler is used to seal the glands of the steam turbine and set up a vacuum in the condenser. At the same time the load of the gas turbine is increased to its full load with the by-pass damper fully opened, after which the by-pass damper is gradually closed while the damper at the entrance of the heat recovery boiler is gradually opened to increase the amount of steam generated by the boiler and thereby increase the load of the steam turbine.

With this conventional method, however, a large amount of NOx generated when the gas turbine is operating at full load is discharged together with the turbine exhaust gas into the atmosphere through the by-pass duct without passing through a denitrating means incorporated in the heat recovery boiler such as that described in the specification of the U.S. Pat. No. 4,106,286. The conventional method also has the disadvantage that an auxilialy boiler must be provided to generate steam for sealing the glands of the steam generator. This does not agree with the principle of the combined plant that all the necessary steam is generated by utilizing the exhaust gases from the gas turbine.

SUMMARY OF THE INVENTION

The object of this invention is to provide a method and device for starting and stopping the gas turbine, whereby when the gas turbine is operating at high load the exhaust gases containing a large amount of NOx are not discharged into the atmosphere and no auxiliary boiler is required for generating steam to seal the glands of the steam turbine.

The method of operating the combined plant according to this invention is characterized by the steps of: operating the gas turbine at a low constant load before the steam turbine is started and after it is stopped; and introducing a part of the exhaust gas from the gas turbine to the heat recovery boiler during the low load operation of the gas turbine. That is, the gas turbine is operated at a low constant load to minimize the amount of NOx discharged together with the exhaust gases and to produce a steam by the heat recovery boiler for sealing the glands of the steam turbine.

The device of this invention for operating the combined plant is characterized by the blow system for discharging the steam exiting from the boiler into the blow tank, the blow system having the capacity of 2-50% of the entire steam generation capacity of the heat recovery boiler. When the amount of steam generated by the boiler becomes small, the turbine by-pass valve can be closed and the main steam pressure adjusted by the blow system.

DESCRIPTION OF THE PREFERRED EMBODIMENTS

Figure 1:
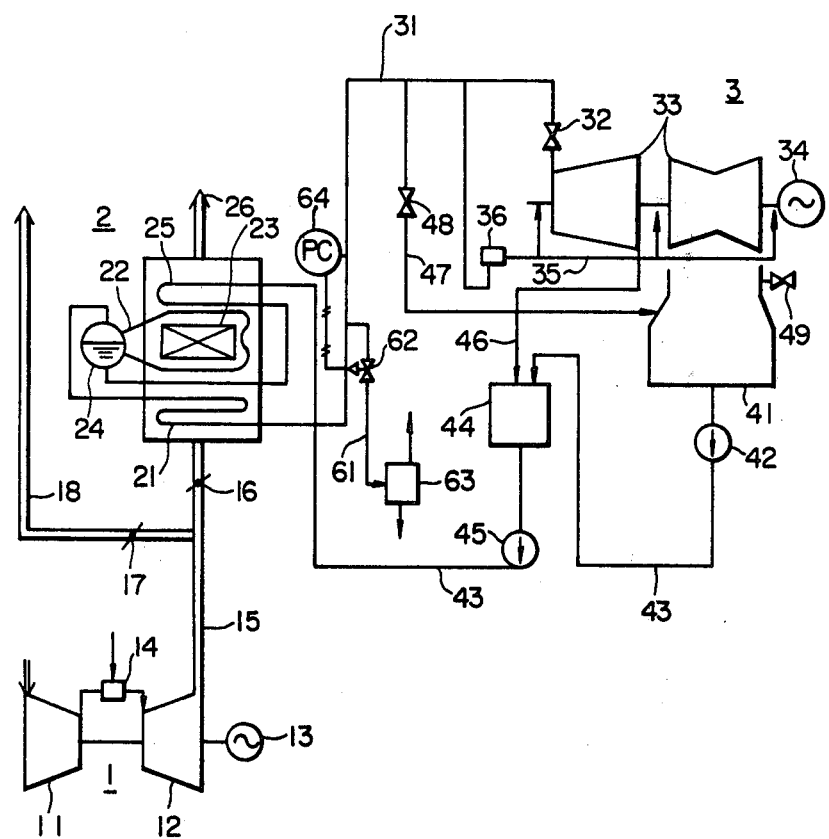
FIG. 1 is a system diagram showing an embodiment of the combined plant of this invention.

The combined plant of this invention consists of a gas turbine plant, a heat recovery boiler, and a steam turbine plant. The gas turbine plant 1 comprises an air compressor 11, a gas turbine 12, a combustor 14 where fuel is injected into the compressed air and burned to drive the turbine 12, and an electrical generator 13 powered by the turbine 12. Exhaust gases discharged from the turbine 12 are led through a duct 15 to a heat recovery boiler 2 where heat is extracted from the exhaust gases, after which they are discharged into the atmosphere from a stack 26. The exhaust gases from the turbine 12 can directly be discharged into the atmosphere through a by-pass duct 18 by closing a damper 16 at the entrance of the heat recovery boiler 2 and opening a by-pass damper 17. As viewed from the upstream to the downstream of the turbine exhaust gas passing through it, the heat recovery steam generator 2 has a superheater 21, an evaporator 22, a denitrating means 23 built into the evaporator 22, a drum 24 and an economizer 25. Feedwater supplied from a steam condenser 41 to the heat recovery boiler 2 is preheated by the economizer 25 and further heated by the evaporator 22 to form a steam-water mixture which rises to the drum 24 where steam is separated from water. The steam is then superheated by the superheater 21 and supplied to a steam turbine 33 to drive it.

The steam turbine plant 3 comprises the steam turbine 33, a main steam pipe 31 for supplying the superheated steam from the superheater 21 of the heat recovery boiler 2 to the steam turbine 33, a steam valve 32 installed on the main steam pipe 31 for controlling the flow of the steam entering the steam turbine 33, a generator 34 driven by the steam turbine 33, and the steam condenser 41 for condensing the steam that has done its work. The water condensed from the steam by the steam condenser 41 is supplied through a feedwater pipe 43 to the economizer 25 of the heat recovery boiler 2 by a condensed water pump 42 and a feedwater pump 45 installed on the feedwater pipe 43. Also installed in the feedwater pipe 43 is a feedwater heater 44 to which the steam extracted from the steam turbine 33 is introduced through a bleeder pipe 46 to heat the feedwater to be supplied to the economizer 25 of the boiler 2.

The steam turbine 33 has a turbine by-pass system consisting of a turbine by-pass pipe 47 and a by-pass valve 48, branching from the main steam pipe 31 and leading to the condenser 41 so that an excess steam can be discharged into the condenser 41. The steam turbine 33 is also provided with a system consisting of a gland seal steam pipe 35 and a gland seal steam regulator 36, through which the steam is supplied to the glands to seal them.

This embodiment of the invention is also characterized in that the steam pressure at the exit of the heat recovery boiler 2 can be adjusted by controlling a pressure regulating valve 62 by a pressure regulator 64, the pressure regulating valve 62 being provided to a steam blow pipe 61 which branches from the main steam pipe 31 at the exit of the heat recovery boiler 2 and leads to a blow tank 63. To ensure an effective operation, it is necessary that the capacity of the regulating valve 62 be more than 2% of the rated steam capacity of the heat recovery boiler 2, but not exceeding 50% for economic discharge of steam and lower cost of equipment. The capacity of the conventional pressure regulating valve is less than 1% of the rated capacity of the boiler.

Figure 2:
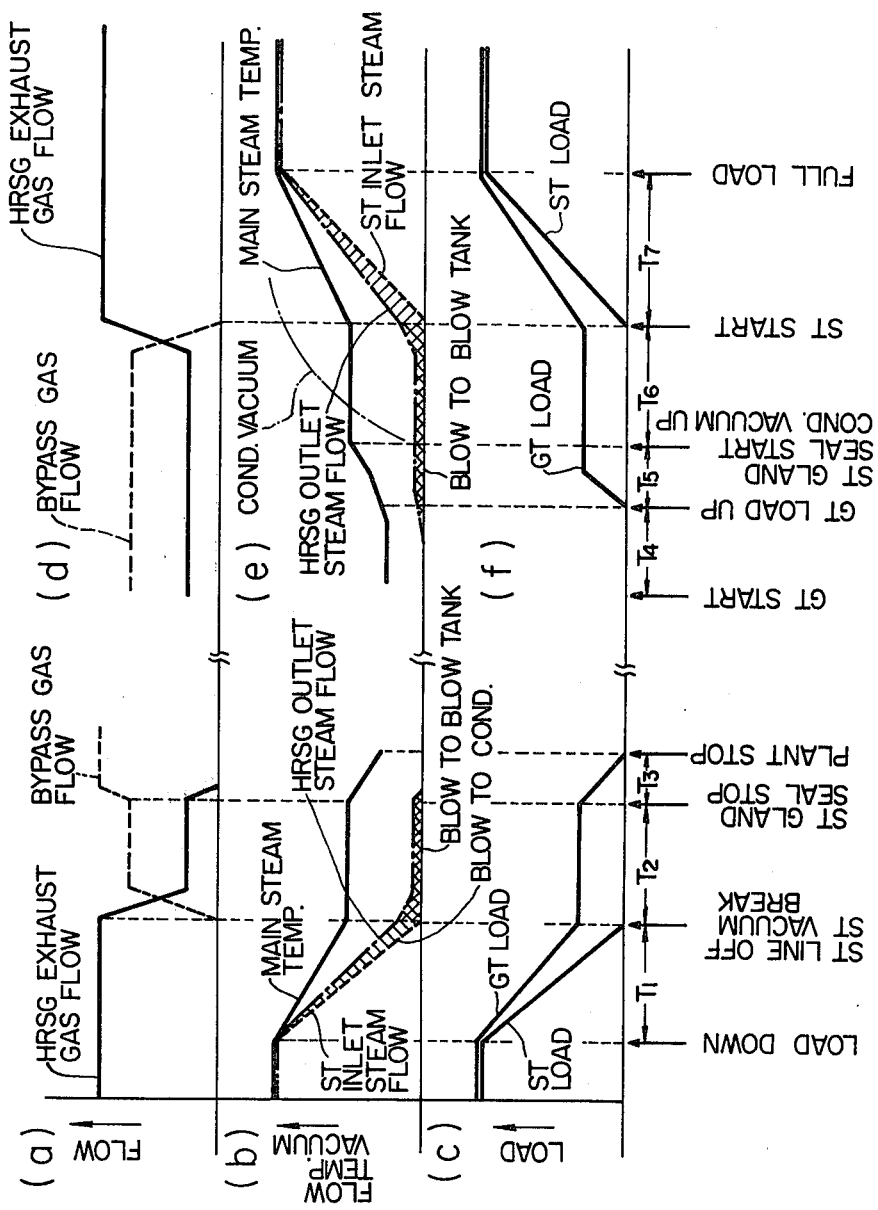
FIG. 2 is a diagram showing how the combined plant is started and stopped in accordance with the method of this invention.
Figure 3:
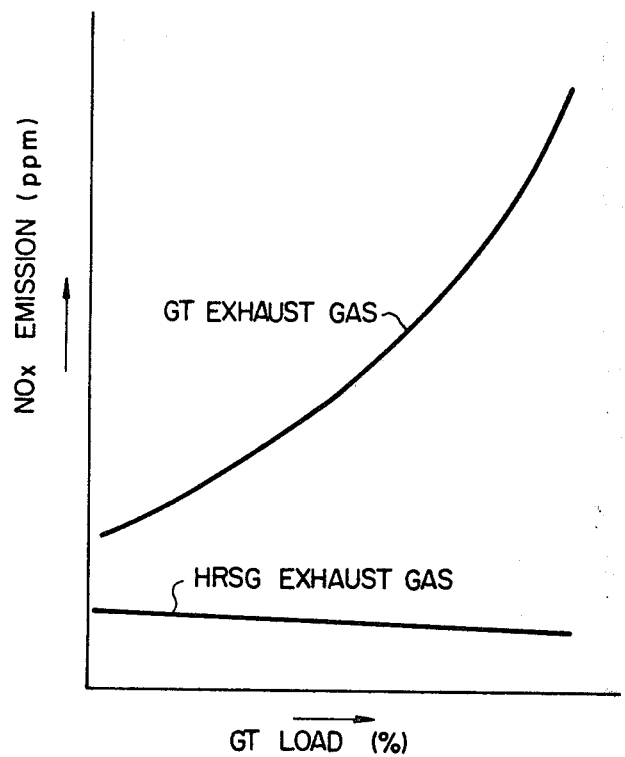
FIG. 3 is a diagram showing the relation between the gas turbine load and the amount of NOx emission.

With reference to FIGS. 2 and 3, we will explain the method of starting and stopping the combined plant of FIG. 1, taking a hot-start as an example. In one method of stopping the combined plant, the loads for the gas turbine plant 1 as well as the steam turbine plant 3 are gradually lowered over the time interval $T_1$ as shown in FIG. 2(c). In this case, if the gas turbine plant 1 is stopped simultaneously with the steam turbine plant 3, a problem will arise that the temperature of the metal of the steam turbine 33 is low when it stops. This is because, as the load of the gas turbine plant 1 decreases, the gas turbine exhaust temperature also decreases lowering the temperature of the steam generated at the heat recovery boiler 2 and therefore the temperature of the steam entering the steam turbine plant 3. To keep the metal temperature of the steam turbine 33 as high as possible when the turbine 33 is stopped, it has been proposed that the steam turbine plant 3 be stopped while the main steam is still high in temperature, as shown in FIG. 2(b), and an excess steam generated at the heat recovery boiler 2 be discharged into the steam condenser 41 by way of the turbine by-pass pipe 47 and the by-pass valve 48.

In this method of stopping the plant, the metal temperature may be high immediately after the steam turbine 33 is stopped. However, this method has the following disadvantages: the vacuum in the condenser 41 must be maintained at high level because the steam is flowing into the condenser 41; as the load of the gas turbine plant 1 is reduced, the main steam—which is reduced in pressure by the gland seal steam pressure regulator 36 and supplied to the glands of the steam turbine 33 to seal them and set up vacuum in the condenser 41–becomes lower in temperature so that the low temperature steam flows into the interior of the steam turbine from the glands, thus lowering the temperature of the metal of the steam turbine 33.

To prevent the metal temperature from falling this invention proposes the following method of stopping the plant. During the time interval $T_2$, the gas turbine plant is kept running at a low constant load, as shown in FIG. 2(c), so that only a small amount of nitrogen oxide (NOX) is discharged from the gas turbine exhaust (as shown in FIG. 3, the small load operation produces a small amount of NOx). The by-pass damper 17 is set at an almost full-open position and the damper at the inlet of the heat recovery boiler 2 is fully opened so that the most of the exhaust gas from the gas turbine 12 is discharged into the atmosphere by-passing the heat recovery boiler 2. (Since the pressure loss of the heat recovery boiler 2 is greater than that of the by-pass duct 18, a large proportion of the gas turbine exhaust gas flows through the by-pass duct 18, as shown in FIG. 2(a), and the main steam is kept at a certain level of temperature, as shown in FIG. 2(b). Since only a small amount of steam of generated at the heat recovery boiler 2, the pressure of the main steam can be adjusted by controlling the pressure regulating valve 62 and discharging a proper amount of steam into the blow tank 63, with the turbine by-pass valve 48 fully closed. Then, the vacuum breaking valve 49 is opened to introduce the atmospheric pressure into the condenser 41, after which the steam being supplied to the glands of the steam turbine 33 is stopped at the beginning of the time interval $T_3$ and the load of the gas turbine plant 1 is lowered.

Now, we will explain the process of starting the plant. During the time interval after the gas turbine has been started until the steam turbine begins to be loaded (i.e., during the time interval of $T_4$, $T_5$ and $T_6$ excepting the last range of $T_6$), the by-pass damper 17 is almost fully opened and the entrance damper 16 is fully opened to permit a part of the gas turbine exhaust gas to flow into the heat recovery boiler 2, as shown in FIG. (d). When the time $T_4$ elapses after the gas turbine has been started, the gas turbine plant 1 is allowed to increase its load up to a low constant level at which it is maintained for a while, as shown in FIG. 2(f). While the gas turbine plant is being operated at the low constant load, the steam generated by the heat recovery boiler 2 is supplied to the glands of the steam turbine 33 and the vacuum level of the condenser 41 is increased, as shown in FIG. 2(e). The main steam cannot be discharged into the condenser 41 through the steam turbine by-pass valve 48 until the vacuum in the condenser 41 increases to a sufficiently high level. During this time interval, the main steam is discharged into the blow tank 63 by the pressure regulating valve 62 (FIG. (e)). When the vacuum in the condenser reaches a sufficient level and the temperature of the main steam becomes equal to that of the steam turbine metal, the load of the gas turbine plant 1 is increased during a time interval of $T_7$ and at the same time the steam turbine plant 3 is loaded with a gradually increasing load.

With this method of starting and stopping the plant, the metal temperature of the steam turbine when it is stopped or when hot-started is somewhat lower than the metal temperature as obtained by the conventional method in which an auxiliary boiler is used to keep the metal warm. Therefore, the time required for hot-starting is somewhat longer than the conventional method. However, the method of this invention has advantages over the conventional method in that the amount of NOx discharged into the atmosphere is smaller so that the restrictive conditions on the plant location can be removed; and that the steam generated by the heat recovery boiler can be used to seal the glands of the steam turbine when starting the steam turbine, so that no auxiliary boiler is necessary, thus obviating equipments associated with the auxiliary boiler and reducing cost.

In the above embodiment, to reduce the amount of steam discharged into the blow tank when starting or stopping the plant, the by-pass damper 17 is set in an almost fully opened position and the entrance damper 16 is fully opened to discharge a large proportion of the exhaust gases from the gas turbine 12 into the atmosphere through the bypass duct 18. The entire amount of the gas turbine exhaust gas can be introduced into the heat recovery boiler 2 by closing the by-pass damper 17 and opening the entrance damper 16 if the capacity of the steam blow pipe 61, the pressure regulating valve 62 and the blow tank 63 is increased sufficiently. This allows no exhaust gas to discharge into the atmosphere through the by-pass duct 18, thus reducing the amount of NOx discharged into the atmosphere. The load level at which the gas turbine is kept running when the plant is being stopped may be changed according to the regulation imposed on the limit of NOx at the location of the plant.

Figure 4:
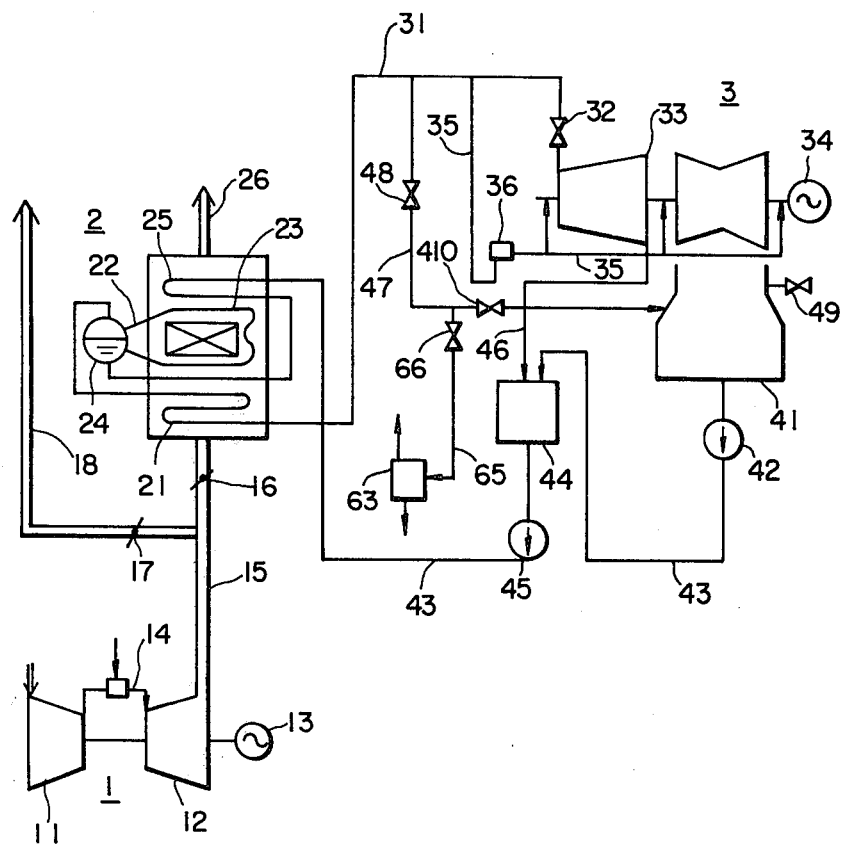
FIG. 4 is a system diagram showing another embodiment of the combined plant according to this invention.

FIG. 4 illustrates the construction of another embodiment of this invention. In this embodiment, a changeover valve 66 is installed in a pipe 65 which branches from the steam turbine by-pass pipe 47 at a point downstream of the by-pass valve 48 and leads to the blow tank 63. The by-pass pipe 47 also has another changeover valve 410 downstream of the branching point of the pipe 65. When the gas turbine is kept running with a small load at the time of starting or stopping the plant, the changeover valve 66 is fully opened and the changeover valve 410 is fully closed to discharge the steam generated by the heat recovery boiler 2 into the blow tank 63 through the turbine by-pass valve 48. This embodiment produces the same effect as obtained by the preceding embodiment.

In the method of this invention, the load of the gas turbine is maintained at a low constant level before the steam turbine is started or after it is stopped, so that the amount of NOx contained in the exhaust gas from the gas turbine is small. Further, a portion of the gas turbine exhaust gas is introduced into the heat recovery boiler in which the exhaust gas is passed through the denitrating means to reduce the NOx. These combined effects will minimize the amount of NOx dishcarged into the atmosphere so that restrictive conditions on the plant location can be removed. In other words, this invention, if applied to the combined plant which is frequently stopped or started, can reduce the amount of NOx discharged from the combined plant into the atmosphere thereby minimizing the pollution of environment. Furthermore, since the steam generated by the heat recovery boiler can be used to seal the glands of the steam turbine, it becomes unnecessary to provide an auxiliary boiler used in the conventional system for producing steam to seal the glands, thus obviating equipments associated with the auxiliary boiler and reducing cost.

I claim:

1. In a combined steam and gas turbine plant consisting of a gas turbine plant, a heat recovery boiler generating steam by the exhaust gas from the gas turbine plant and incorporating a denitrating means for reducing the amount of nitrogen oxide (NOx) discharged into the atmosphere, and a steam turbine plant driven by the steam generated by the heat recovery boiler; a method of operating the combined plant comprising the steps of: starting the gas turbine plant and running it at a low constant load; introducing the exhaust gas from the gas turbine to the heat recovery boiler to generate steam during the low load operation of the gas turbine plant; sealing the glands of the steam turbine by supplying the steam from the heat recovery boiler to the glands; and starting the steam turbine.

2. In a combined steam and gas turbine plant consisting of a gas turbine plant, a heat recovery boiler generating steam by the exhaust gas from the gas turbine plant and incorporating a denitrating means for reducing the amount of nitrogen oxide (NOx) discharged into the atmosphere, and a steam turbine plant driven by the steam generated by the heat recovery boiler; a method of operating the combined plant comprising the steps of: stopping the steam turbine; keeping the gas turbine running at a low constant load for a certain period of time; introducing the exhaust gas from the gas turbine to the heat recovery boiler to generate steam during the low load operation of the gas turbine plant; and sealing the glands of the steam turbine by supplying the steam from the heat recovery boiler to the glands.

3. In a combined steam and gas turbine plant consisting of a gas turbine plant, a heat recovery boiler generating steam by the exhaust gas from the gas turbine plant and incorporating a denitrating means for reducing the amount of nitrogen oxide (NOx) discharged into the atmosphere, and a steam turbine plant driven by the steam generated by the heat recovery boiler; a method of operating the combined plant comprising the steps of: running the gas turbine plant at a low constant load after the steam turbine has been stopped and before the steam turbine is started; introducing the exhaust gas from the gas turbine to the heat recovery boiler to generate steam during the low load operation of the gas turbine; and sealing the glands of the steam turbine by supplying the steam from the heat recovery boiler to the glands.

4. A method of operating the combined plant as set forth in claim 2, wherein while the gas turbine is being operated at a low constant load, a steam turbine by-pass valve is closed, the vacuum in a condenser is broken and the supply of steam for sealing the glands of the steam turbine is stopped, and finally the gas turbine is stopped.

5. A method of operating the combined plant as set forth in claim 1, wherein while the gas turbine is being operated at a low constant load, the steam generated by the heat recovery boiler is used to seal the glands of the steam turbine and the vacuum in the steam condenser is increased.

6. A method of operating the combined plant as set forth in claim 2, wherein while the gas turbine is being operated at a low constant load, further comprising the step of discharging excess steam from the heater recovery boiler into a blow tank via a steam blow system connected to the steam system connecting the heat recovery boiler and the steam turbine, the steam blow system having the capacity of 2-50% of the total steam generation capacity of the heat recovery boiler.

7. A method of operating the combined plant as set forth in claim 1, wherein the step of running the gas turbine plant at a low constant load includes running the gas turbine plant for a certain period of time, and further including the step of increasing the vacuum in the condenser of the steam turbine during the low load operation of the gas turbine prior to starting of the steam turbine.

8. A method of operating the combined plant as set forth in claim 7, further comprising the steps of: stopping the steam turbine; keeping the gas turbine running at a low constant load for a certain period of time; introducing the exhaust gas from the gas turbine to the heat recovery boiler to generate steam; sealing the glands of the steam turbine by supplying the steam from the heat recovery boiler to the glands and breaking the vacuum in the condenser of the steam turbine during the low load operation of the gas turbine; stopping the steam supply into the glands of the steam turbine; and stopping the gas turbine.

* * * * *